United States Patent
Weiner et al.

(10) Patent No.: US 7,610,845 B2
(45) Date of Patent: Nov. 3, 2009

(54) ADJUSTABLE STOP ASSEMBLY FOR A PISTON-CYLINDER UNIT

(76) Inventors: Uwe Weiner, Talstrasse 111, Düsseldorf (DE) D-40217; Oliver Schröter, Kluse 4, Mülheim an der Ruhr (DE) D-45470

( * ) Notice: Subject to any disclaimer, the term of this patent is extended or adjusted under 35 U.S.C. 154(b) by 261 days.

(21) Appl. No.: 11/575,290

(22) PCT Filed: Sep. 30, 2005

(86) PCT No.: PCT/DE2005/001753

§ 371 (c)(1),
(2), (4) Date: Mar. 14, 2007

(87) PCT Pub. No.: WO2006/037297

PCT Pub. Date: Apr. 13, 2006

(65) Prior Publication Data

US 2008/0060511 A1      Mar. 13, 2008

(30) Foreign Application Priority Data

Oct. 1, 2004      (DE)  .................. 20 2004 015 412 U

(51) Int. Cl.
*F15B 15/24* (2006.01)
*F16D 1/08* (2006.01)
(52) U.S. Cl. .................... 92/13.7; 403/344
(58) Field of Classification Search .............. 92/13.7; 285/390, 391; 403/112, 118, 344
See application file for complete search history.

(56) References Cited

U.S. PATENT DOCUMENTS

| | | | | |
|---|---|---|---|---|
| 370,168 A | * | 9/1887 | Truxal | ............... 403/344 |
| 718,727 A | * | 1/1903 | Potstada | ............... 403/344 |
| 758,549 A | * | 4/1904 | Melius | ............... 403/344 |
| 3,079,187 A | | 2/1963 | Cantor | |
| 4,736,674 A | | 4/1988 | Stoll | |

FOREIGN PATENT DOCUMENTS

| | | |
|---|---|---|
| DE | 2850237 A | 1/1978 |
| DE | 8437887 U1 | 8/1985 |
| DE | 3525029 A1 | 1/1987 |
| JP | 06-280828 A | 2/1995 |
| JP | 09-025909 | 1/1997 |

OTHER PUBLICATIONS

National Center for Industrial Property Information and Training, English Abstract of JP 06-280828.
National Center for Industrial Property Information and Training, English Abstract of JP 09-025909.
English Abstract of DE 2850237.
The International Bureau of WIPO, English translation of International Preliminary Report on Patentability for PCT/ DE2005/001753, May 3, 2007.

* cited by examiner

*Primary Examiner*—Michael Leslie
(74) *Attorney, Agent, or Firm*—Cahn & Samuels LLP

(57) ABSTRACT

The invention concerns an adjustable stop assembly, for limiting a stroke, designed for a piston-cylinder unit comprising a cylinder and a piston having a rod, said stop assembly serving to limit the stroke of a lifting device on a forklift truck. Said assembly has a clamping ring (2) axially slidable and lockable on the piston rod, comprising, in one region of its external periphery, a threaded portion. Said assembly also comprises a threaded ring (3) which can be screwed on the threaded portion of the clamping ring and whereof the side facing the cylinder serves as stop thereon.

4 Claims, 3 Drawing Sheets

ADJUSTABLE STOP ASSEMBLY FOR A PISTON-CYLINDER UNIT

This application is the National Stage of International Application No. PCT/DE2005/001753, filed on Sep. 30, 2005, which claimed the benefit of Application No. 20 2004 015 412.9 filed in Germany on Oct. 1, 2004.

I. FIELD OF INVENTION

The invention relates to an adjustable stop assembly used for stroke limitation for a piston/cylinder unit having a cylinder and a piston, which has a piston rod, for example for the stroke limitation of a lifting apparatus on a forklift truck, having a clamping ring, which is axially displaceable on the piston rod, can be fixed in clamping fashion and has a threaded section in a region of its outer circumference, and having a threaded ring, which can be screwed onto the threaded section of the clamping ring and whose front edge facing the cylinder is used as a stop on the cylinder.

II. BACKGROUND OF THE INVENTION

For example for forklift trucks, various lifting apparatuses are known by means of which the load-bearing forks can be lifted or lowered and which have, for example, a plurality of extendable supporting masts. These supporting masts, which can be extended and retracted telescopically and have either profiled mounts or piston/cylinder units, essentially function by a pressure medium being applied to them, the forks being actuated in a known manner by means of a chain assembly. The height of the loads which can be stacked on is in each case dependent on the design of the forklift truck. The lowermost fork position is essentially designed such that the undersides of the forks can rest directly on the flat ground or can be moved so as to rest on the flat ground.

It often arises in practice that, for example owing to wear on the tire profile of the forklift truck tires, the forks are lowered so far downwards that either sections of the underside of the forks or the entire underside of the forks drag on the floor when the forklift truck is in motion. This results not only in the floor on which the forks are dragging being damaged but also in, over time, the forks themselves being worn or damaged and the entire stroke limitation mechanism being negatively impaired or damaged by the influence of impacts. In such a case, the worn forks need to be replaced, which under some circumstances can be very expensive.

In order to avoid this, it is proposed to provide an assembly for adjusting the lowermost fork position. For this purpose, for example, utility model G-U-84 37 887 proposes an adjustable stop assembly used for stroke limitation for a piston/cylinder unit which has a clamping ring, which can be displaced axially on the piston rod, can be fixed in clamping fashion and has a threaded section in a region of its outer circumference, and a threaded ring, which can be screwed onto the threaded section of the clamping ring and whose front edge facing the cylinder is used as a stop on the cylinder. By adjusting (screwing) the threaded ring in relation to the clamping ring, the lower front edge which is used as the stop on the cylinder of the piston/cylinder unit can be set in a relatively simple manner.

A conventional forklift truck having a lifting apparatus having a piston/cylinder unit can be retrofitted, for example, with such an adjustable stop assembly. For this purpose, the lifting apparatus needs to be disassembled to such an extent that the piston rod is removed from the corresponding cylinder and exposed in order that, first, the clamping ring can be pushed onto the piston rod and, subsequently, fixed in clamping fashion to the piston rod. Then, the threaded ring is pushed onto the piston rod and screwed onto the outer threaded section of the clamping ring before the lifting apparatus can be fitted again. Retrofitting a piston/cylinder unit of a forklift truck with an adjustable stop assembly used for stroke limitation in accordance with this prior art requires, owing to the disassembly/fitting of the lifting apparatus having the forks, a large amount of operational downtime, in which the forklift trucks cannot be used, as a result of which the retrofitting is overall cost-intensive.

III. SUMMARY OF THE INVENTION

The invention provides an adjustable stop assembly, which is used for stroke limitation and is provided for a piston/cylinder unit, for example for stroke limitation of a lifting apparatus on a forklift truck, which can be retrofitted on forklift trucks in a simple and cost-effective manner.

In accordance with the invention, an adjustable stop assembly used for stroke limitation for a piston/cylinder unit, for example for the stroke limitation of a lifting apparatus on a forklift truck, of the type mentioned at the outset is primarily characterized by the fact that the clamping ring and the threaded ring are each split diametrically into two ring halves, the two ring halves of the clamping ring being capable of being connected to one another by means of a connection apparatus and of being fixedly clamped on the piston rod, and the two ring halves of the threaded ring being capable of being connected to one another by means of a connection apparatus such that the threaded ring can be screwed onto the threaded sections of the ring halves of the clamping ring.

Since both the clamping ring and the threaded ring to be screwed onto it are in each case split diametrically into two ring halves, which are capable of being connected to one another in each case by means of a suitable connection apparatus to form a complete ring shape, the lifting apparatus does not need to be disassembled in order to attach the clamping ring and the threaded ring. Instead, first the clamping ring can be fixed on the piston rod, which is freely accessible per se, using simple handles and also quickly, without needing to remove the piston rod from the associated cylinder, by the two ring halves in each case being placed radially on the piston rod and then being connected to one another, the connection apparatus being such that the clamping ring can be fixedly clamped to the piston rod in the desired position. Then, the threaded ring can be attached around the piston rod in the same manner, the connection apparatus for connecting the two ring halves of the threaded ring being designed such that the now complete threaded ring can be screwed onto the outer thread of the clamping ring with its inner thread.

In order, on the one hand, to be able to fixedly clamp the clamping ring on the piston rod and, on the other hand, to be able to screw the threaded ring onto the clamping ring, at least the two mutually associated, assembled ring halves of the clamping ring have a clamping gap, which can be formed, for example, by virtue of the fact that at least one of the two mutually associated ring halves, in cross section, describes a ring sector which extends over slightly less than 180°. In order, however, to avoid a situation in which the associated ring halves need to be associated with one another as a pair, each of the ring halves for example has a sector of slightly less than 180°. Since the piston/cylinder unit of a conventional forklift truck is essentially an assembly with standardized dimensions, the adjustable stop assembly according to the invention used for stroke limitation can be retrofitted for virtually all types of forklift trucks. Otherwise, clamping rings/threaded rings which are matched to the respective piston rod diameters can also be made available.

The front face of the threaded ring, which faces the cylinder associated with the corresponding piston rod, is used as a stop on the, for example, free front edge of the cylinder. However, it is also possible that a corresponding opposing stop is formed on the cylinder itself, the corresponding front face of the threaded ring, as the stroke limitation stop, coming to bear against said opposing stop. Owing to the adjustment or screwing of the threaded ring on the clamping ring, the front face acting as the stop of the threaded ring can be adjusted in relation to the free front face of the cylinder or in relation to the opposing stop. This relates firstly to the basic setting for the stroke limitation when the adjustable stop assembly is refitted, it also being possible for the stop to subsequently be adjusted in one direction in the event, for example, of further wear on the wheels, or for the stop to be adjusted in the other direction once new wheels have been fitted, with the result that, in the latter case, the forks can be lowered again in relation to the ground.

In order to avoid a situation in which the position of the threaded ring in relation to the clamping ring changes during the operation of the forklift truck, for example brought about by oscillations owing to severe shaking movements of the forklift truck, the threaded ring is for example capable of being clamped with the threaded sections of the ring halves of the clamping ring by means of the associated connection apparatus.

In accordance with one configuration of the invention, the connection apparatus of the clamping ring and/or the connection apparatus of the threaded ring is in each case formed from a tensioning ring. This tensioning ring, or else tensioning clip, in this case respectively surrounds the two mutually associated ring halves. In this case, the tensioning ring is placed in that region around the ring halves of the clamping ring in which the tensioning ring does not collide with the threaded ring to be screwed on, the tensioning ring of the threaded ring for example also being suitable for clamping the threaded ring to the threaded sections of the ring halves of the clamping ring. However, for example, a separate clamping screw for clamping or securing the threaded ring on the clamping ring can also be provided on the threaded ring.

In accordance with one development of the invention, the ring halves of the clamping ring and/or the ring halves of the threaded ring each have flange sections on their end section facing away from the associated cylinder, the respective connection means being arranged on said flange sections.

In accordance with one further configuration of the invention, the respective two mutually associated ring halves are capable of being connected by means of at least one screw, which for example extends through two mutually associated flange sections of the ring halves and forms the connection apparatus. It is possible here for only a connection screw to be provided on one side of the ring halves, whereas a hinge assembly can be formed on that side of the ring halves which faces diametrically away from the connection screw, by means of which hinge assembly the ring halves are connected to one another such that they can pivot or can be hooked to one another releasably. However, two connection screws may also be provided on the sides of the respective ring which face diametrically away from one another.

The connection screw of the threaded ring and/or of the clamping ring may be a bolt, which extends through a hole in the flange section of one ring half and can be screwed into a threaded drilled hole in the flange section of the other ring half.

IV. BRIEF DESCRIPTION OF THE DRAWINGS

The invention will be described by way of example using the following drawings.

V. DETAILED DESCRIPTION OF INVENTION

Figure 1:
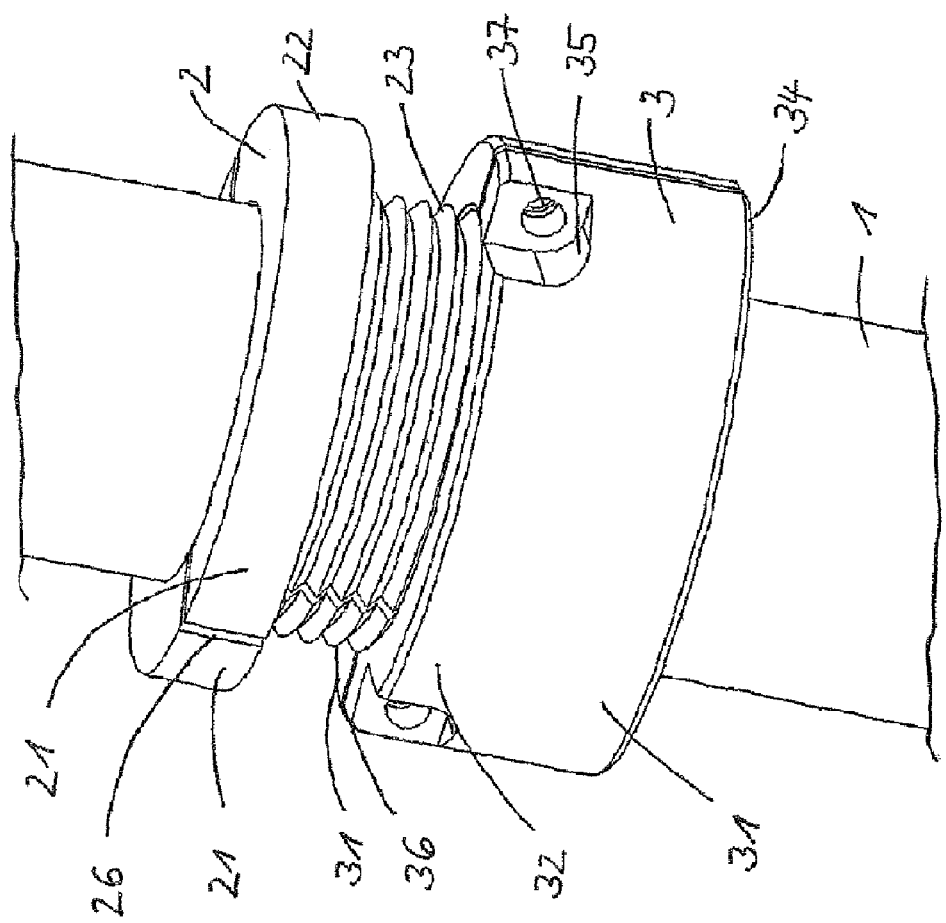
FIG. 1 illustrates schematically, an example embodiment of the stop assembly according to the invention.
Figure 2:
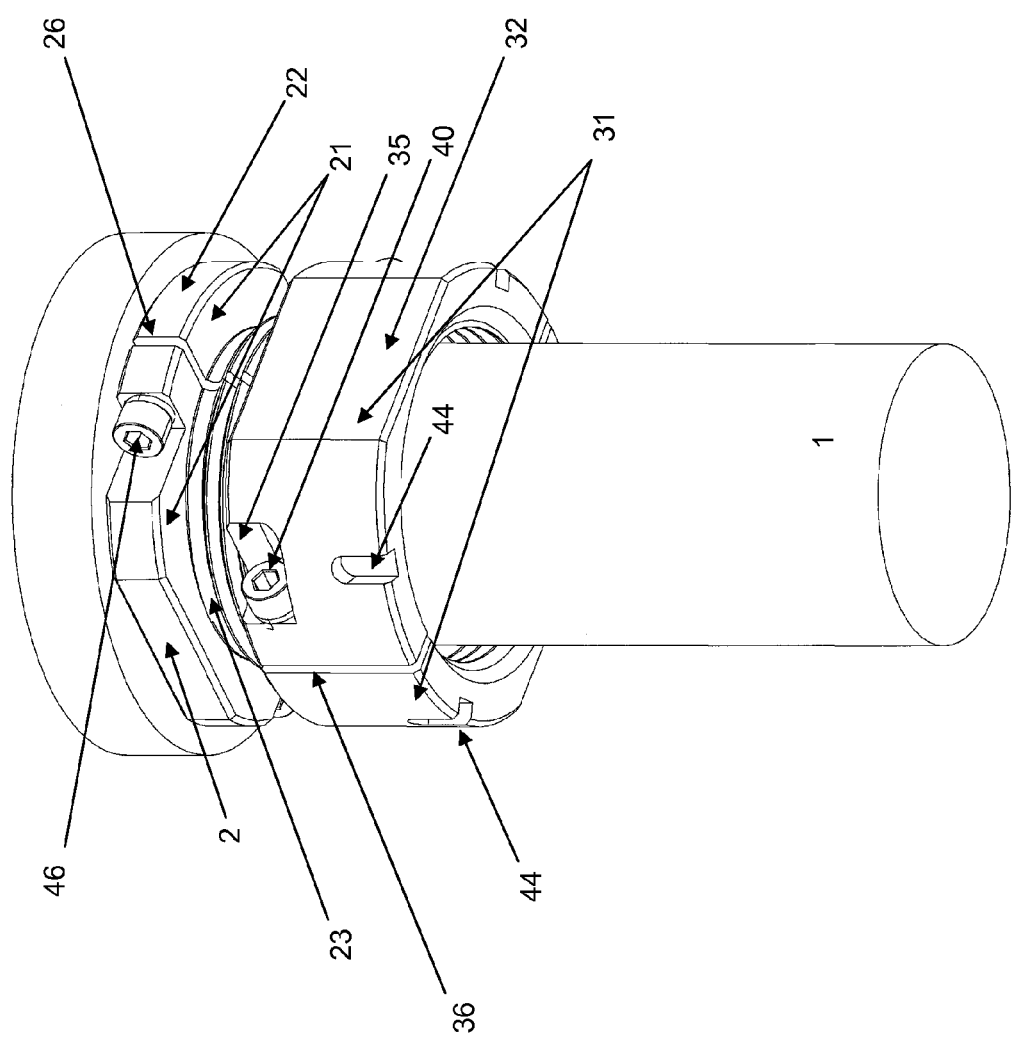
FIG. 2 illustrates an alternative embodiment of the stop assembly showing adjusting screws and an engagement eye.
Figure 3:
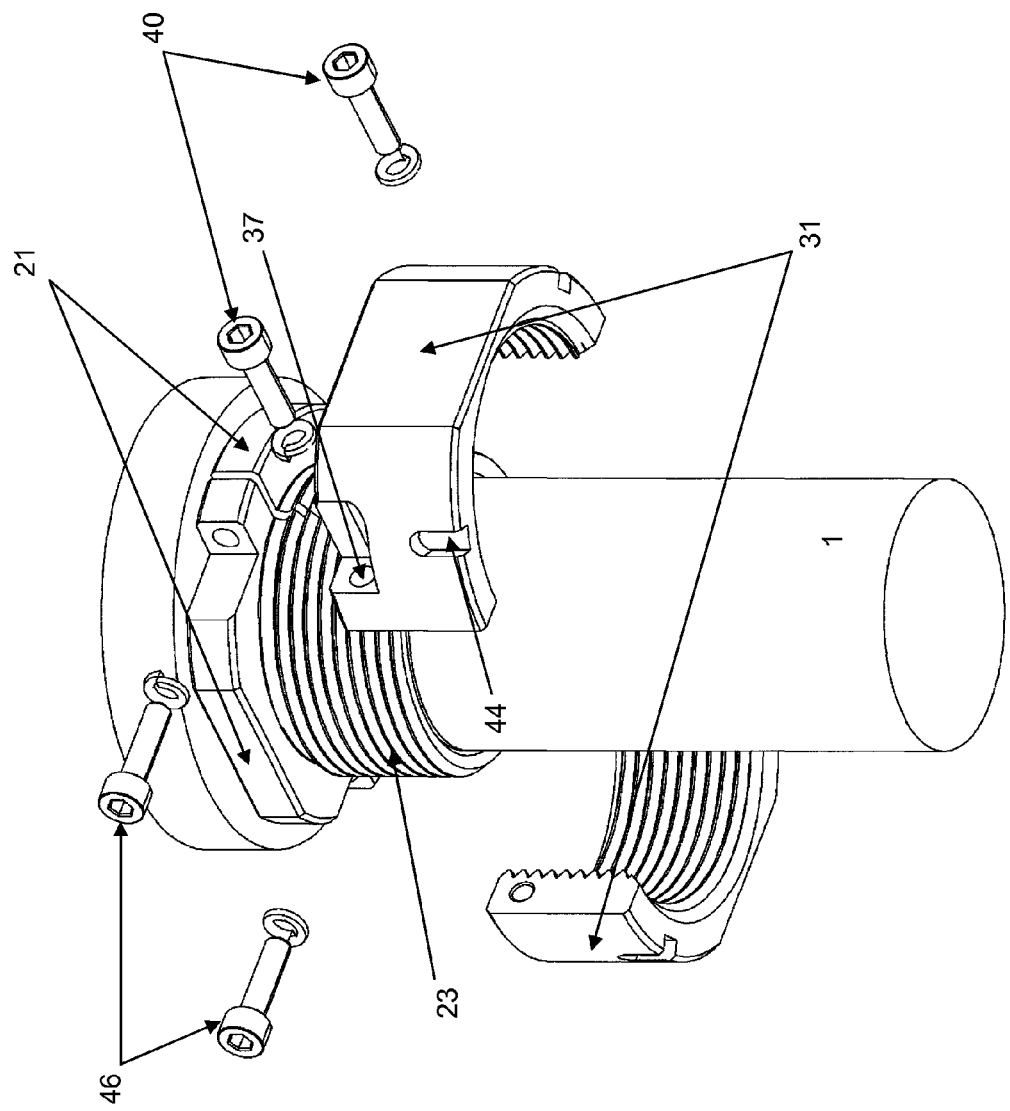
FIG. 3 illustrates an exploded view of the example embodiment shown in FIG. 2.

Referring now to the figures where like reference numbers denote like elements FIG. 1 illustrates a piston rod 1 of a cylinder/piston unit, on which a clamping ring 2 according to the invention is fixedly clamped, the clamping ring 2 being split diametrically into two ring halves 21. The two ring halves 21 of the clamping ring 2 are placed or laid radially onto the piston rod 1, which is freely accessible per se, of the cylinder/piston unit and are fixedly clamped in the desired position on the piston rod 1 by means of a connection apparatus, as shown in FIG. 2 and FIG. 3, which will be explained in more detail using an example of a connection apparatus for the threaded ring 3. The two ring halves 21 each have a threaded section 23 and a flange section 22. In order to be able to fixedly clamp the ring halves 21 of the clamping ring 2 on the piston rod 1, at least one clamping gap 26 is formed between the two ring halves 21, which clamping gap can be formed by virtue of the fact that at least one of the two ring halves 21, in cross section, describes a ring sector which extends over slightly less than 180.degree., but which is only very small when the clamping ring 2 is fixedly clamped on the piston rod 1.

Referring now to FIG. 2 and FIG. 3 with continued reference to FIG. 1 a threaded ring 3, which is split diametrically into two ring halves 31 as is the clamping ring 2, is screwed onto the threaded section 23 of the clamping ring 2, the ring halves 31 each being provided with an inner thread on their inner sides facing the clamping ring 2. The ring halves 31 of the threaded ring 3 are connected to one another by means of a connection apparatus 35, 37 such that the threaded ring 3 can be screwed onto the threaded sections 23 of the ring halves 21 of the clamping ring 2, in accordance with this embodiment at least one narrow clamping gap 36 being formed between the two ring halves 31 of the threaded ring 3 in this screwed-on state. In order to maintain the stop setting and to avoid automatic adjustment of the threaded ring 3, this means that, when the threaded ring 3 is screwed onto the clamping ring 2 to such an extent that the free lower front face 34, which acts as the stop on the cylinder, of the threaded ring 3 is in the required stop setting, the threaded ring 3 can be clamped to the threaded sections 22 of the ring halves 21 of the clamping ring 2 by means of the connection apparatus 35, 37 whilst overcoming or at least reducing the clamping gap 36. The clamping of the threaded ring 3 to the clamping ring 2 can be brought about, however, in addition or as an alternative, by means of an adjusting screw (not illustrated), which extends radially through the threaded ring and is screwed so far in, for clamping purposes, that its end pointing toward the clamping ring 2 acts on the clamping ring 2. However, the fact that the threaded ring 3 is clamped onto the clamping ring 2 achieves the additional advantage that the ring halves 21 of the clamping ring 2 as well are clamped together further in the region of the threaded sections 23 and, as a result, the effective clamping area between the clamping ring 2 and the piston rod 1 is increased.

The two ring halves 31 of the threaded ring 3 each have a flange section 32, in this embodiment the flange sections 32 in each case running along the upper end section of the respective ring half 31 and having parts of the connection apparatus of the threaded ring 3, namely a hole 35 and a threaded hole 37.

The connection apparatus of the threaded ring 3 in accordance with the embodiment illustrated may likewise have a bolt 40, as shown in FIG. 2 and FIG. 3, which extends through the hole 35 in the flange section 32 of one ring half 31 and is screwed into the threaded drilled hole 37 in the adjoining flange section 32 of the other ring half 31. A connection apparatus, which has a design corresponding to the example described, with a bolt 40 is for example provided on the other side of the two adjoining flange sections 32 of the ring halves 31. The threaded drilled hole 37 may be in the form of a through-hole, however, through which the bolt extends onto which a nut is screwed for the purpose of connecting the two ring halves 31. It is also possible to provide radially extending lug-shaped projections, which have the hole or the threaded drilled hole, instead of the peripheral flange sections 22 or 23 in those regions in which the two associated ring halves at least approximately adjoin one another. In addition, however, a connection apparatus having a different design can be arranged on one of the two sections which have the connection apparatus, which connection apparatus having a different design has, for example, in a similar manner to a clamping collar connection, a hook or an eye 44, in which the hook engages, while the opposite connection apparatus is formed by means of the bolt assembly 46, by means of which, ultimately, the clamping ring 2 is fixedly clamped to the piston rod 1. However, a quick-action tensioning apparatus can also be arranged instead of this bolt assembly.

As illustrated in FIG. 2 and FIG. 3, the connection apparatus of the clamping ring 2, can be designed as one of the connection apparatuses shown for the threaded ring 3. For example, the connection apparatus for the clamping ring 2 may be in the form of a tensioning ring, which extends around the two mutually associated ring halves 21, for example in the region of the flange sections 22 illustrated in FIG. 1 and FIG. 2 the, and fixedly clamps the two ring halves 21 on the piston rod 1.

The invention claimed is:

1. An adjustable stop assembly used for stroke limitation for a piston/cylinder unit having a cylinder and a piston, which has a piston rod, for the stroke limitation of a lifting apparatus on a forklift truck, said assembly having a clamping ring, which is axially displaceable on the piston rod, can be fixed in clamping fashion on the piston rod and has a threaded section in a region of its outer circumference, and a threaded ring, which can be screwed onto the threaded section of the clamping ring and whose front edge facing the cylinder is used as a stop on the cylinder, wherein the clamping ring and the threaded ring are each split the two ring halves of the clamping ring being capable of being connected to one another by means of a first connection apparatus and of being fixedly clamped on the piston rod by means of the first connection apparatus, the two ring halves of the threaded ring being capable of being connected to one another by means of a second connection apparatus such that the threaded ring can be screwed onto the threaded sections of the ring halves of the clamping ring and clamped to the threaded sections of the ring halves of the clamping ring by means of the second connection apparatus, the ring halves of the clamping ring having flange sections on their end section facing away from the associated cylinder, the first connection apparatus being arranged on said flange sections, the ring halves of the clamping ring are connected by means of at least one screw, which extends through two mutually associated flange sections of the ring halves.

2. The stop assembly as claimed in claim 1, the connection apparatus of the threaded ring having a bolt, which extends through a hole in the flange section of one ring half and is capable of being screwed into a threaded drilled hole in the flange section of the other ring half.

3. The assembly as claimed in claim 1, wherein at least one of said clamping ring halves extends over less than 180 degrees.

4. The assembly as claimed in claim 1, wherein said second connection apparatus includes a pair of hole and recess sets on opposing sides of one of said threaded ring halves, and a pair of holes on opposing sides of the other of said threaded ring halves, and a pair of adjusting screws in communication with a respective hole and recess set and hole.

* * * * *

UNITED STATES PATENT AND TRADEMARK OFFICE
CERTIFICATE OF CORRECTION

| | |
|---|---|
| PATENT NO. | : 7,610,845 B2 |
| APPLICATION NO. | : 11/575290 |
| DATED | : November 3, 2009 |
| INVENTOR(S) | : Uwe Weiner and Oliver Schröter |

It is certified that error appears in the above-identified patent and that said Letters Patent is hereby corrected as shown below:

At column 4, line 53, "threaded sections 22" should read --threaded sections 23--.

At column 5, line 23, "flange sections 22 or 23" should read --flange sections 22 or 32--.

Signed and Sealed this

Third Day of August, 2010

David J. Kappos
*Director of the United States Patent and Trademark Office*